May 6, 1930.  W. H. DUNNE  1,757,116
ROLLER SKATE WHEEL
Filed Aug. 25, 1928
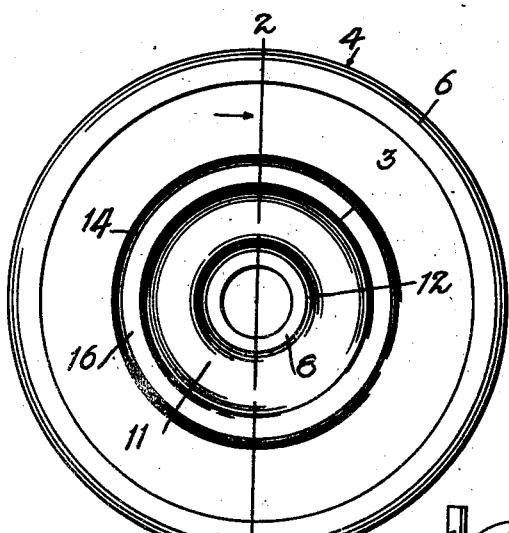
Fig. 1.
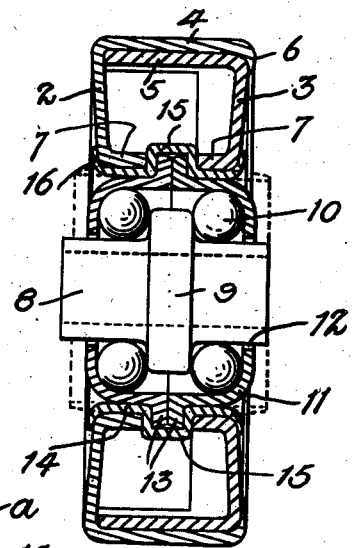
Fig. 2.
Fig. 3.
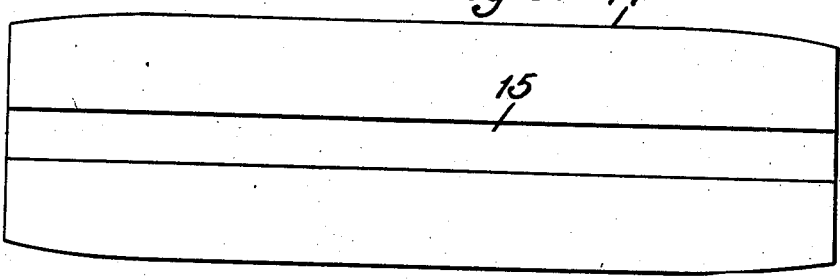
Fig. 4.
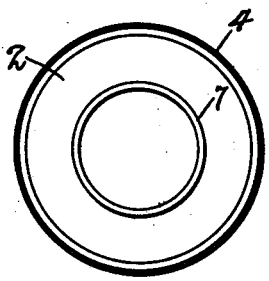
Fig. 5.
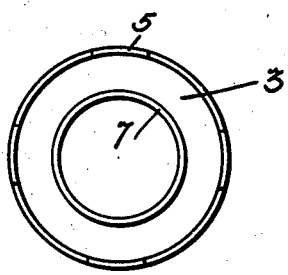
Fig. 6.
Inventor.
W. H. Dunne,
By Egerton R. Case,
Atty.

Patented May 6, 1930

1,757,116

UNITED STATES PATENT OFFICE

WILLIAM HAMILTON DUNNE, OF TORONTO, ONTARIO, CANADA

ROLLER-SKATE WHEEL

Application filed August 25, 1928. Serial No. 301,987.

My invention relates to improvements in roller skate wheels, and the principal object of my invention is to lock the cups of the ball bearings as well as the two-part casing or body of the wheel so as to absolutely prevent separation thereof, even though the tread of said body or casing be worn completely away, and in the following specification and the drawings forming part thereof, I shall describe and illustrate my invention, and what I claim as new will be set forth in the claims forming part of this specification.

Fig. 1 is a side elevation of my wheel. Fig. 2 is a vertical cross section on the line 2—2, Fig. 1. Fig. 3 is an end elevation of the cups for the ball bearings showing the manner in which the locking sleeve is formed therearound. Fig. 4 is a plan view of the locking sleeve before being formed into a tubular member, and Figs. 5 and 6 are elevations from the inner sides of the members of the casing or body of the wheel.

In the drawings, like characters of reference refer to the same parts.

At the outset it must be understood that although I specifically refer to my invention as a roller skate wheel, it may be used as a caster.

The casing or body of the wheel is well-known, and consists of the two parts 2 and 3 so constructed as to be readily assembled one within the other and to reinforce each other. The member 2 has one wall adapted to serve as a tread 4, and the other member has spaced portions 5 preferably in the form of lugs which fit inside the member 2 and abut against the web of this member. The member 2 is rolled or flanged backwardly at 6 around the edge of the member 3 to permanently secure these parts together. Each member 2 and 3 is provided with an inturned flange 7. 8 is a support, preferably tubular, to receive the axle (not shown) for the wheel. This support is provided substantially centrally with the radial flange 9, and against the outer sides of this flange are located the balls 10. 11 are the cups, and each cup is provided with a central opening 12 to permit these cups to be held in proper relationship to the said balls and support 8 and provide the necessary clearance with said support 8. Each cup is provided at its inner side with a radial flange 13. These flanges are substantially of like size, and in the organized wheel they rest in contact. Now in order to prevent the spreading of these cups, I provide a locking sleeve 14 provided centrally with a channel 15. When the elements of the ball bearings have been assembled and the flanges of the cups placed together, these parts are suitably held in assembled relation, and then the locking sleeve 14 previously partly shaped, as shown in Fig. 3, is brought into relation therewith so as to place the flanges 13 in the channel 15, and then the ends $a$ of said locking sleeve are bent down into shape thus completely housing said flanges 13. This locking sleeve is first formed flat as shown in Fig. 4, and then it is formed into the U-shape shown in Fig. 3. Since the sides of the channel 15 rest snugly in contact with the outer sides of the flanges 13, the tubular locking sleeve 14 will positively prevent the parts of the ball bearing separating. The sides of the locking sleeve project outwardly as shown by dotted lines in Fig. 2, and then the members 2 and 3 as well as said sleeve 14 are forced together with the flange 7 of each member riding over said tubular sleeve until these flanges contact with the outer sides of the channel 15, and then the outer edges of said locking sleeve 14 are rolled or flanged outwardly as shown at 16 into contact with the inner portions of the web of the members 2 and 3, thus positively locking these members against separation.

Even should the tread 4 of the member 2 as well as the lugs 5 of the member 3 be worn away, there will be no possibility of the said members separating. Therefore it is evident that I have produced a roller skate wheel which will not be dangerous to use even after the tread has disappeared.

The members 2 and 3, as well as the cups 11 which form the ball races with their radial flanges 13, are already known, as well as the support 8 and the radial flange 9, but it is new to the art to provide unitary means which simultaneously lock said cups and members against lateral displacement. And by means of my invention, I have produced a wheel or caster which while strongly built can be produced at a very low cost.

As is shown clearly in Fig. 2, the locking sleeve 14 of course rests snugly in contact with the cups 11, and since the flanges 7 have a tight fit with said locking sleeve, a firm backing is provided said cups.

I believe I have developed a method of assembling and locking together the associated elements of an anti-friction bearing, which method I have already clearly set forth.

I do not confine myself to necessarily using balls in the wheel or caster.

What I claim as my invention is:

1. A roller skate wheel comprising a support provided substantially centrally with a radial flange; a pair of centrally-apertured cups housing said radial flange and each provided at its inner side with a radial flange, the said cup flanges being placed together; balls mounted between each side of said radial flange and said cups; a locking sleeve embracing said cups and having a central channel in which is snugly located the flanges of said cups so as to lock said cups against lateral displacement, and a wheel consisting of two interfitting members one of which is provided with a tread, and each member being provided with an inner flange whereby it is mounted on said sleeve at opposite sides of the channel thereof in contact therewith, the ends of said locking sleeves being rolled or flanged outwardly against their associated members of the wheel, the whole arranged for the purpose specified.

2. In a roller skate or like wheel, in combination a support provided substantially centrally with a radial flange; a pair of centrally-apertured cups housing said radial flange, and each provided at its inner side with a radial flange, the said cup flanges being placed together and located radially in alignment with said radial flange; anti-friction means mounted between each side of said radial flange of the support and said cups, and a locking sleeve made from a single strip of metal of the desired gauge having a radially outwardly-extending central channel stamped therein, said sleeve being bent into substantially circular form around the assembled cups to house the said contacting flanges within said channel, and to contact with said cups beyond the outer sides of said flanges thereby holding all of said elements in assembled relationship.

3. An assembled anti-friction bearing in which anti-friction elements are placed at each side of the radially-disposed flange of a bearing-support; centrally-apertured flange-provided cups placed over said bearing-support to house said anti-friction elements and flange with said cup-flanges placed together; a substantially U-shaped member adapted to receive said assembled cups with the abutting flanges thereof located in an outwardly-extending central channel formed in said member to hold these parts in assembled relationship, and then bent into circular form around said cups and the flanges thereof to firmly hold these parts against displacement both radially and laterally.

WILLIAM HAMILTON DUNNE.